J. E. & W. H. GIBBS.
Churn-Dasher.
No. 216,033. Patented June 3, 1879.
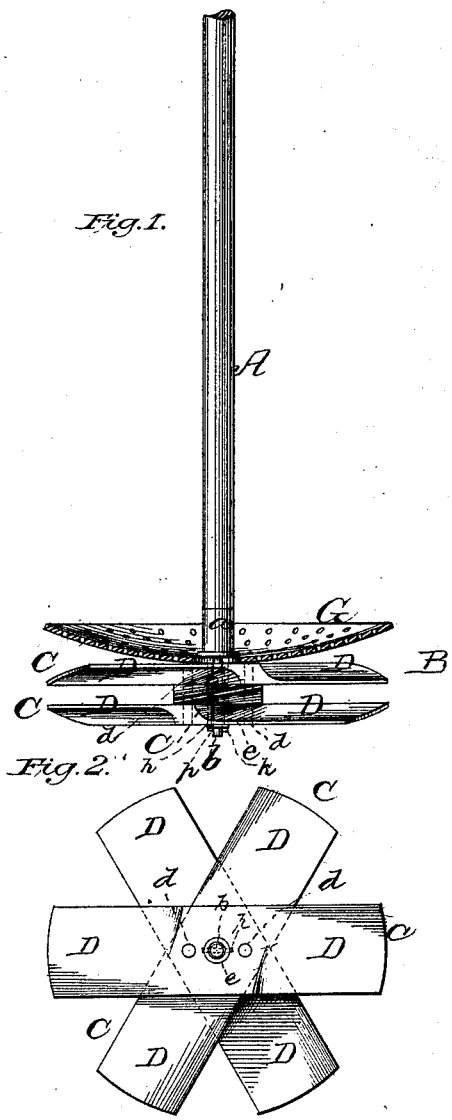

UNITED STATES PATENT OFFICE.

JAMES E. GIBBS AND WILLIAM H. GIBBS, OF SCOTTSBOROUGH, ALABAMA.

IMPROVEMENT IN CHURN-DASHERS.

Specification forming part of Letters Patent No. 216,033, dated June 3, 1879; application filed March 29, 1879.

*To all whom it may concern:*

Be it known that we, JAMES E. GIBBS and WILLIAM H. GIBBS, of Scottsborough, in the county of Jackson and State of Alabama, have invented a new and valuable Improvement in Churn-Dashers; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side view of our improved churn-dasher, and Fig. 2 is a bottom view of the same.

This invention has relation to revolving churn-dashers; and it consists in the construction and novel arrangement of the wooden sections, having their ends inclined in opposite directions, said sections being pinned together and provided with a tubular center bearing, through which passes the spindle at the lower end of the dash-rod, as hereinafter shown and described.

In the accompanying drawings, the letter A designates the dash-rod, having at its lower end a metallic thimble or shoulder-piece, $a$, and a spindle, $b$, extending downward. The dash B consists of several curved pieces or sections, C, of wood. Each of these sections has a central portion, $c$, of which the upper and lower surfaces are parallel. From this central part the end blades, D, extend, being formed by cutting away the wood above and below on the opposite sides, and in oppositely-inclined planes or bevels, so as to form at each end of the section a thin laterally-inclined blade, whereof one end is level with the upper surface of the central portion, and the other flush with the lower surface thereof, the two blades at opposite ends of the sections being oppositely inclined. Each section is similarly formed, and when the sections are placed with their blades radially arranged and their central portions one on the other, and secured together by means of pins $d$, the dasher is formed.

In order to provide for the wear, a tubular bearing, $e$, is let through the center of the dasher, this bearing being headed at each end on the wooden surface, or otherwise secured. The dasher is then slipped on the spindle $b$ of the lower end of the dash-rod, and is supported by a washer, $h$, and a pin, $k$, under said washer passing through a perforation, $p$, in the lower end of the spindle.

The dasher being placed in the cream and moved up and down, in the ordinary manner, by means of its rod, the action of the cream on the inclined blades causes it to revolve rapidly, first in one direction, then in another. This movement is designed to keep the cream constantly aerated from the top to the bottom. Splashing is avoided to a great extent, as in this aerator it is not necessary to withdraw the dasher entirely from the cream at every stroke.

G represents a gatherer, or concave perforated disk of metal, which is slipped on the rod, and, resting on the dash, is let down into the milk after the butter is formed. Then the operator, by turning the dasher around a few times, can take all the butter from the churn without inconvenience.

W are aware that rotating dashers are not new, and we do not, broadly, claim such invention.

What we claim as new, and desire to secure by Letters Patent, is—

The dasher consisting of the wooden sections C, having oppositely-inclined thin end blades, D, and squared central portions, $c$, seated one on the other, with the blades radially arranged, the central portions pinned together, and provided with a tubular bearing, $e$, for the spindle $b$, at the lower end of the dash-rod, as specified.

In testimony that we claim the above we have hereunto subscribed our names in the presence of two witnesses.

JAMES EDWIN GIBBS.
WILLIAM HENRY GIBBS.

Witnesses:
N. G. STUART,
JOHN E. WISE.